(12) United States Patent
Jonnalagedda et al.

(10) Patent No.: US 10,590,837 B2
(45) Date of Patent: Mar. 17, 2020

(54) TURBOCHARGER WASTEGATE ASSEMBLY

(71) Applicants: Srikanth Jonnalagedda, Windsor (CA); Lurun Zhong, Troy, MI (US)

(72) Inventors: Srikanth Jonnalagedda, Windsor (CA); Lurun Zhong, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 63 days.

(21) Appl. No.: 15/843,014

(22) Filed: Dec. 15, 2017

(65) Prior Publication Data

US 2019/0186349 A1 Jun. 20, 2019

(51) Int. Cl.
- F02B 37/18 (2006.01)
- F04D 29/28 (2006.01)
- F04D 29/42 (2006.01)
- F02B 39/00 (2006.01)

(52) U.S. Cl.
CPC ............ *F02B 37/183* (2013.01); *F02B 39/00* (2013.01); *F04D 29/284* (2013.01); *F04D 29/4206* (2013.01)

(58) Field of Classification Search
CPC .. F01N 2340/06; F01N 3/0236; F02B 37/183; F02C 6/12
USPC ................. 60/280, 281, 602, 600, 614, 615
See application file for complete search history.

(56) References Cited

U.S. PATENT DOCUMENTS

| 2016/0024998 A1 | 1/2016 | Day et al. |
| 2016/0061208 A1 | 3/2016 | Marques et al. |
| 2016/0084153 A1 | 3/2016 | Marques et al. |
| 2016/0245158 A1 | 8/2016 | Lotz et al. |
| 2016/0341112 A1 | 11/2016 | Goeckelmann et al. |
| 2017/0145936 A1* | 5/2017 | Kimura ..................... F01N 3/20 |
| 2017/0152793 A1 | 6/2017 | Albrecht et al. |
| 2019/0003366 A1* | 1/2019 | Kimura ..................... F01N 3/10 |

FOREIGN PATENT DOCUMENTS

| EP | 2743475 A1 | 5/2014 |
| EP | 2832968 A1 | 2/2015 |
| JP | 2017180288 A * | 10/2017 |
| WO | 2013160633 A1 | 10/2013 |
| WO | 2016094268 A1 | 6/2016 |

OTHER PUBLICATIONS

International Search Report and Written Opinion dated Mar. 11, 2019 for International Application No. PCT/US2018/064654, International Filing Date Dec. 10, 2018.

* cited by examiner

*Primary Examiner* — Mark A Laurenzi
*Assistant Examiner* — Mickey H France
(74) *Attorney, Agent, or Firm* — Ralph E Smith

(57) ABSTRACT

A turbocharger includes a housing, a turbine wheel, a bypass channel formed in the housing, a wastegate assembly having a valve and configured to selectively allow a flow of exhaust gas to bypass the turbine wheel via the bypass channel, and a wastegate outer housing having an aperture fluidly coupled to the bypass channel, and an outer valve seating surface, the valve configured to selectively seat against the outer valve seating surface over the aperture. A shroud extends outwardly from the wastegate outer housing and is configured to direct the bypass exhaust gas flow toward a catalytic converter.

16 Claims, 5 Drawing Sheets

TURBOCHARGER WASTEGATE ASSEMBLY

FIELD

The present application relates generally to turbochargers and, more particularly, to turbocharger wastegate assemblies.

BACKGROUND

Typical turbochargers include a compressor and a turbine coupled by a common shaft. An air intake supplies air to the compressor where it is compressed, mixed with fuel, and subsequently directed to the engine cylinders for combustion therein. Exhaust gases from the engine are directed to the turbine, utilized to drive the compressor, and subsequently directed to an exhaust system of the vehicle. Some turbochargers include a wastegate between exhaust inlet and exhaust outlet portions of the turbocharger to allow gas to bypass the turbine and go directly to the exhaust system. This enables control over turbocharger boost pressure, for example, to prevent overspeed or overboost. However, bypass flow during peak power conditions can cause accelerated wear and/or potential damage to the catalyst brick if the flow is not uniformly spread thereacross. Accordingly, while such systems work well for their intended purpose, it is desirable to provide continuous improvement in the relevant art.

SUMMARY

According to one example aspect of the invention, a turbocharger is provided. The turbocharger includes, in one exemplary implementation, a housing, a turbine wheel, a bypass channel formed in the housing, a wastegate assembly having a valve and configured to selectively allow a flow of exhaust gas to bypass the turbine wheel via the bypass channel, and a wastegate outer housing having an aperture fluidly coupled to the bypass channel, and an outer valve seating surface, the valve configured to selectively seat against the outer valve seating surface over the aperture. A shroud extends outwardly from the wastegate outer housing and is configured to direct the bypass exhaust gas flow toward a catalytic converter.

In addition to the foregoing, the described turbocharger may include one or more of the following features: wherein the shroud is angled relative to the outer valve seating surface; wherein the shroud includes a ramped surface angled relative to a longitudinal axis of the bypass channel; wherein the ramped surface is disposed at an angle '$\alpha$' relative to the longitudinal axis of the bypass channel; wherein the angle '$\alpha$' is between approximately 30° and approximately 60'; wherein the angle '$\alpha$' is determined by the equation $$\tan^{-1}\left[\frac{t}{2h}\right],$$

where 't' is a deflector thickness and 'h' is a wastegate opening height at peak power; and wherein the shroud extends from and along a perimeter of the outer valve seating surface.

According to another example aspect of the invention, a turbocharger is provided. The turbocharger includes, in one exemplary implementation, a housing, a turbine wheel, a bypass channel formed in the housing, a wastegate assembly having a valve and configured to selectively allow a flow of exhaust gas to bypass the turbine wheel via the bypass channel, and a wastegate outer housing having an aperture fluidly coupled to the bypass channel, and an outer valve seating surface. The valve is configured to selectively seat against the outer valve seating surface over the aperture. A plurality of flow deflectors extend outwardly from the wastegate outer housing, the flow deflectors configured to direct the bypass exhaust gas flow toward a catalytic converter.

In addition to the foregoing, the described turbocharger may include one or more of the following features: wherein flow channels are defined between adjacent flow deflectors and configured to receive at least a portion of the bypass exhaust gas flow from the bypass channel; wherein the flow deflectors extend from a perimeter ledge of the wastegate outer housing; wherein the flow deflectors of at least a portion of the plurality of flow deflectors have a trapezoidal cross-section; wherein an angle '$\beta$' is defined between sidewalls of adjacent flow deflectors of trapezoidal cross-section; wherein the angle '$\beta$' is between approximately 30° and approximately 45°; wherein the flow deflectors of at least a portion of the plurality of flow deflectors have a rectangular cross-section; wherein the flow deflectors of at least a portion of the plurality of flow deflectors have an airfoil shaped cross-section; and wherein the flow deflectors of at least a portion of the plurality of flow deflectors have a triangular cross-section.

According to yet another example aspect of the invention, a vehicle is provided. The vehicle includes, in one exemplary implementation, an exhaust system having a catalytic converter and a turbocharger. The turbocharger includes a housing, a turbine wheel, a bypass channel formed in the housing, a wastegate assembly having a valve and configured to selectively allow a flow of exhaust gas to bypass the turbine wheel via the bypass channel, and a wastegate outer housing having an aperture fluidly coupled to the bypass channel, and an outer valve seating surface, the valve configured to selectively seat against the outer valve seating surface over the aperture. A shroud extends outwardly from the wastegate outer housing, the shroud configured to direct the bypass exhaust gas flow toward the catalytic converter. A plurality of flow deflectors extend outwardly from the wastegate outer housing, the flow deflectors configured to direct the bypass exhaust gas flow toward the catalytic converter.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
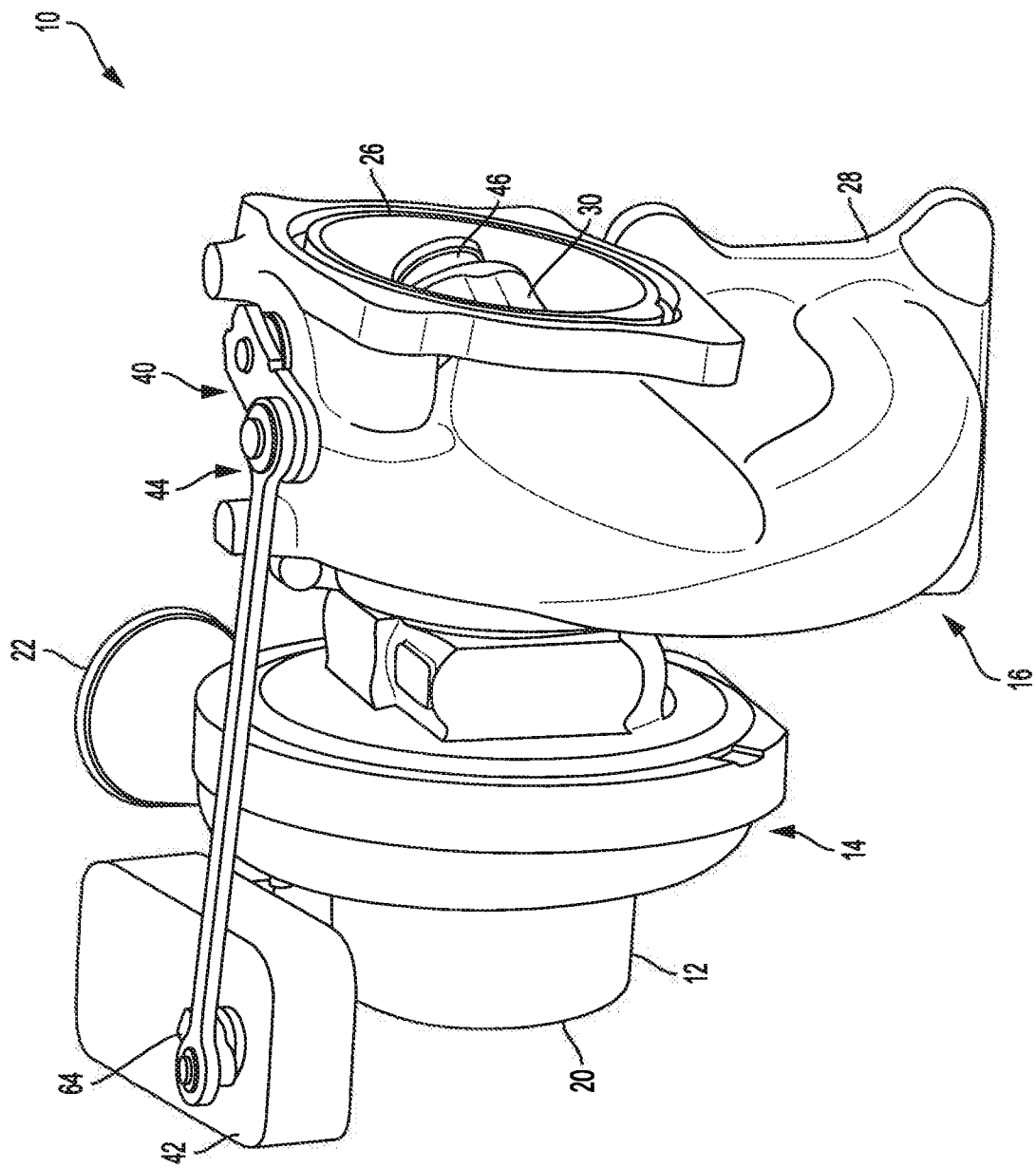
FIG. 1 is a perspective view of an example turbocharger in accordance with the principles of the present disclosure.

With general reference to the Figures, and with initial reference to FIG. 1, an example turbocharger is illustrated and generally identified at reference numeral 10. In the example embodiment, turbocharger 10 generally includes a housing 12 having a compressor portion 14 and a turbine portion 16. Compressor portion 14 includes a compressor wheel (not shown) that is rotatably coupled to a turbine wheel (not shown) of turbine portion 16 via a shaft (not shown). Compressor portion 14 includes an inlet 20 configured to receive ambient air, and an outlet 22 in fluid communication with a vehicle engine (not shown). The turbine portion 16 includes an exhaust inlet 26 configured to receive exhaust from the engine, and an exhaust outlet 28 fluidly coupled to an exhaust system 24 (FIG. 7) of the vehicle. The compressor portion 14 and the turbine portion 16 can have constructions known in the art.

Figure 2:
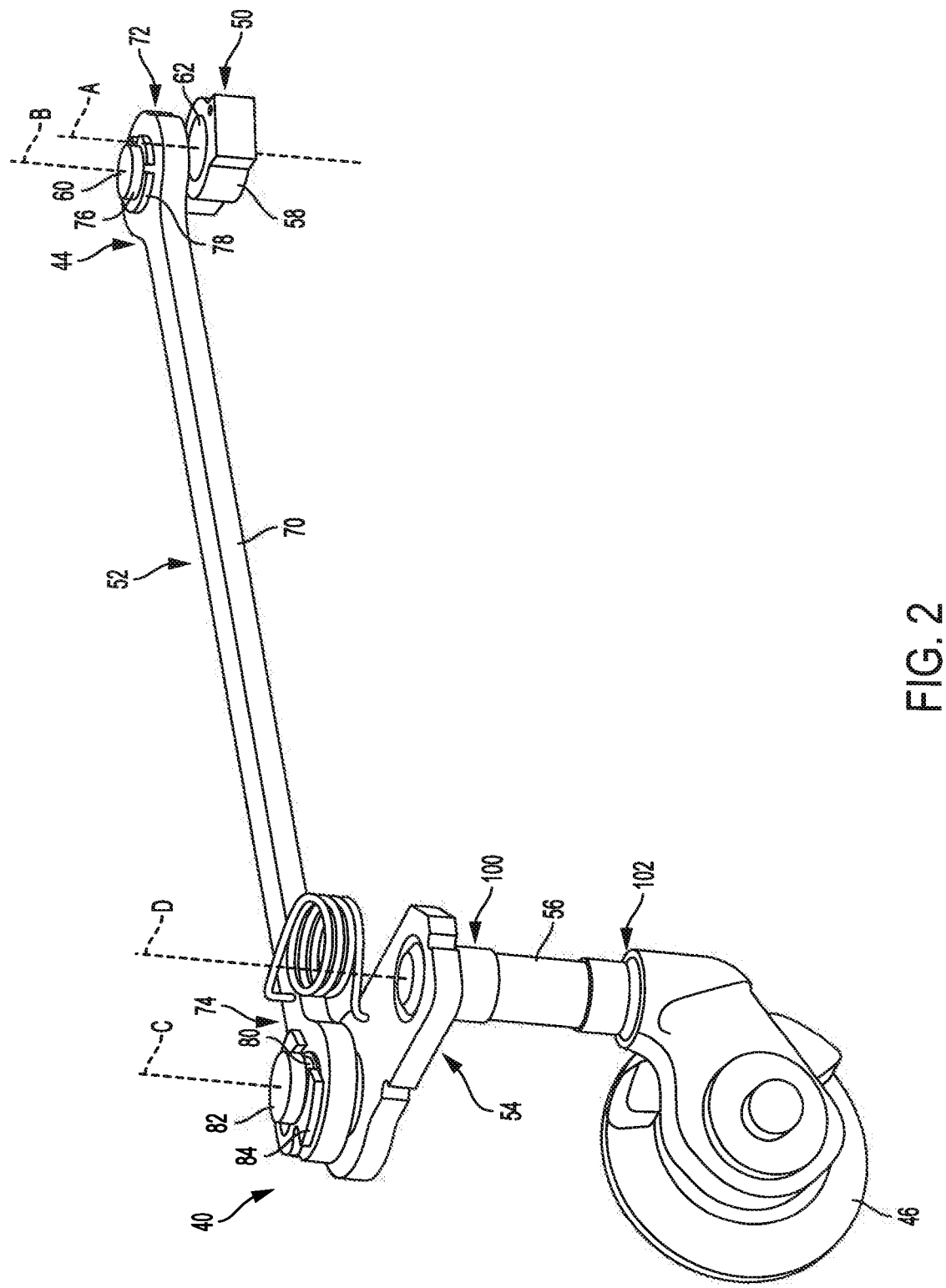
FIG. 2 is a perspective view of an example wastegate assembly shown in FIG. 1, in accordance with the principles of the present application.

With additional reference to FIG. 2, turbocharger 10 further includes a wastegate assembly 40 configured to selectively allow exhaust gas to bypass the turbine wheel via a bypass channel 30 formed in turbocharger housing 12. The bypass channel 30 provides fluid communication between the turbine exhaust inlet 26 and the turbine exhaust outlet 28. Wastegate assembly 40 includes a valve 46 that selectively opens and closes to control the flow of exhaust gas through bypass channel 30.

In the example embodiment, wastegate assembly 40 generally includes an actuator 42, a linkage 44, and valve 46. In the illustrated example, actuator 42 is a DC electric motor, however, actuator 42 may be any suitable actuator that enables wastegate assembly 40 to function as described herein.

In the illustrated example, linkage 44 generally includes an actuator member or crank 50, a wastegate rod 52, an arm member or crank 54, and an arm 56.

In the example embodiment, actuator crank 50 generally includes a body 58, a pin 60 extending therefrom, and an aperture 62 configured to receive a keyed pin 64 (FIG. 1) of actuator 42. Aperture 62 receives keyed pin 64 such that actuator crank 50 is coupled to actuator 42 and configured to rotate about an axis 'A' (see FIG. 2) when actuator 42 is actuated.

In the example embodiment, wastegate rod 52 generally includes a body 70 having a first end 72 and an opposite second end 74. First end 72 defines an aperture 76 configured to receive pin 60 of actuator crank 50. In this way, first end 72 is rotatably coupled to actuator crank 50 about an axis 'B' (see FIG. 2). A circlip 78 is configured to maintain pin 60 within aperture 76. Second end 74 defines an aperture 80 configured to receive a pin 82 of arm crank 54. In this way, second end 74 is rotatably coupled to arm crank 54 about an axis 'C' (see FIG. 2). A circlip 84 is configured to maintain pin 82 within aperture 80.

In the example embodiment, arm crank 54 generally includes a body 90, pin 82, and an aperture 92 configured to receive arm 56. Aperture 92 receives arm 56 such that arm crank 54 is coupled to arm 56 and configured to rotate arm 56 about an axis 'D' (see FIG. 2) when actuator 42 is actuated. A biasing member 94 is coupled between wastegate rod 52 and arm crank 54 and configured to bias the linkage 44 to position valve 46 in the closed position.

In the example embodiment, arm 56 generally includes a first end 96 and an opposite second end 98. Arm first end 96 is inserted into arm crank aperture 92, and arm second end 98 is inserted into valve 46. As arm 56 is rotated about axis 'D', the valve 46 is moved to various positions between a closed position (FIG. 1) and a fully open position (not shown). Thus, wastegate assembly 40 is configured to control the amount of exhaust gas flow into bypass channel 30 and thus the boost pressure in the engine.

Figure 4:
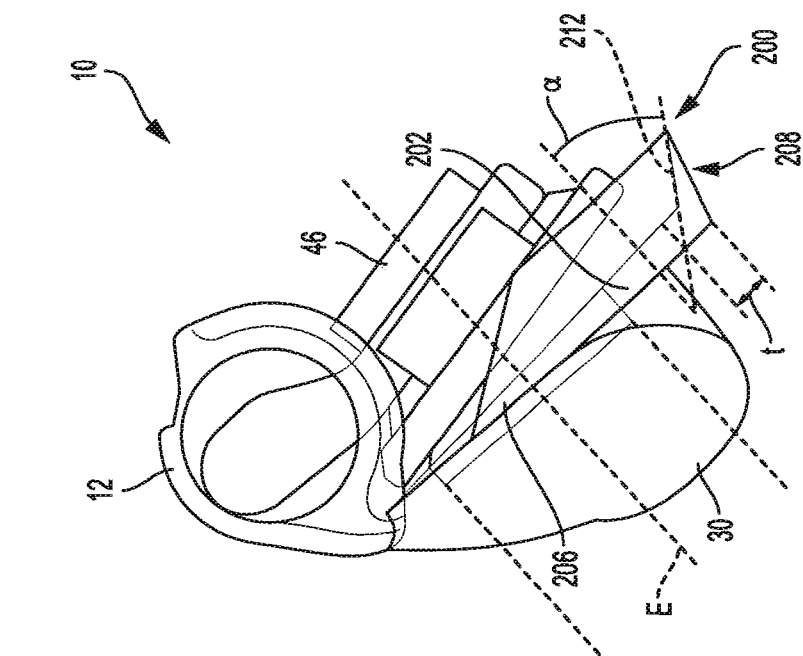
FIG. 4 is a side view of the wastegate outer housing and shroud shown in FIG. 3, in accordance with the principles of the present application.
Figure 3:
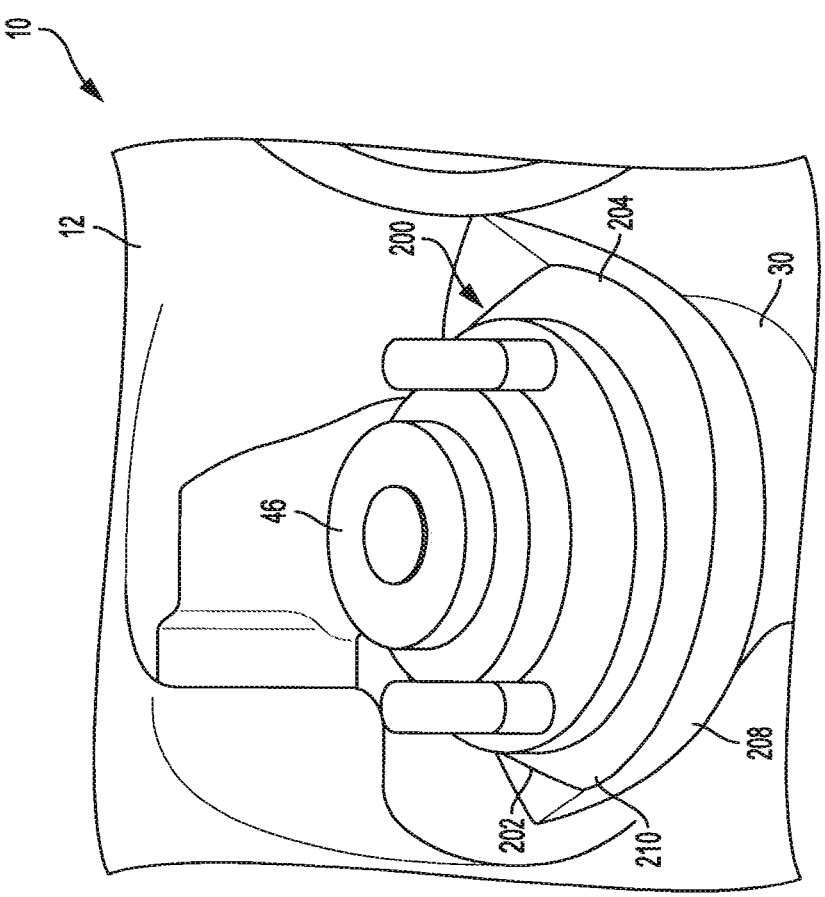
FIG. 3 is a perspective view of an example wastegate outer housing having a shroud in accordance with the principles of the present application.

FIGS. 3 and 4 illustrate one example wastegate outer housing 200 coupled to the bypass channel 30. The wastegate outer housing 200 includes a side wall 202, an outer valve seating surface 204, and an aperture 206. The outer valve seating surface 204 is configured to provide a seating surface for wastegate valve 46, and aperture 206 is configured to fluidly couple to the bypass channel 30.

Figure 7:
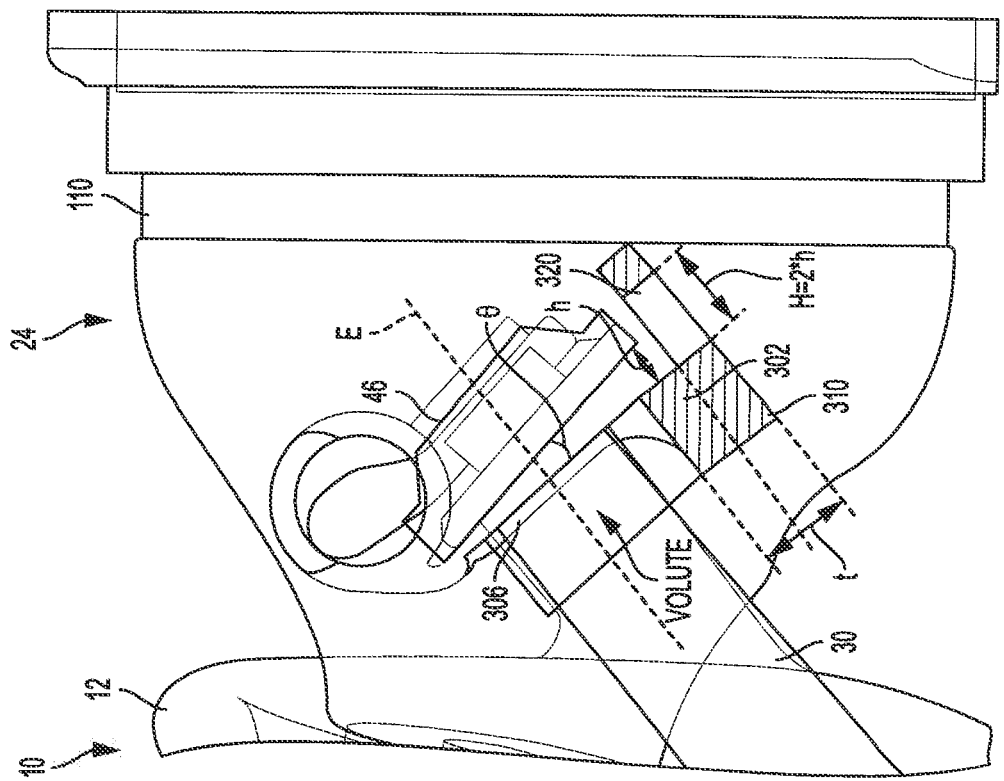
FIG. 7 is a side view of an example turbocharger and exhaust system utilizing the wastegate outer housing and flow deflectors shown in FIGS. 5 and 6, in accordance with the principles of the present application.

In the example embodiment, wastegate outer housing 200 includes a shroud 208 configured to direct and/or uniformly spread wastegate bypass flow towards and across a catalyst 110 (e.g., see FIG. 7). As illustrated, shroud 208 extends upwardly and outwardly (as shown in FIG. 3) from a perimeter 210 of the outer valve seating surface 204. In this way, shroud 208 defines a ramped surface 212 disposed at an angle 'α' relative to a longitudinal axis 'E' of the bypass channel 30. In the illustrated embodiment, longitudinal axis 'E' is perpendicular to or substantially perpendicular to the plane of outer valve seating surface 204.

In one example, angle 'α' is between approximately 30° and approximately 60° or between 30° and 60°. In other embodiments, shroud angle 'α' is determined by the equation $$\tan^{-1}\left[\frac{t}{2h}\right],$$

where 't' is a wastegate housing thickness, and 'h' is a wastegate opening height at peak power (see FIG. 7, where angle 'θ' is the wastegate opening angle at peak power). However, it will be appreciated that shroud 208 may be disposed at various other angles depending on the relative locations between the wastegate outer housing 200 and the catalyst 110.

Figure 6:
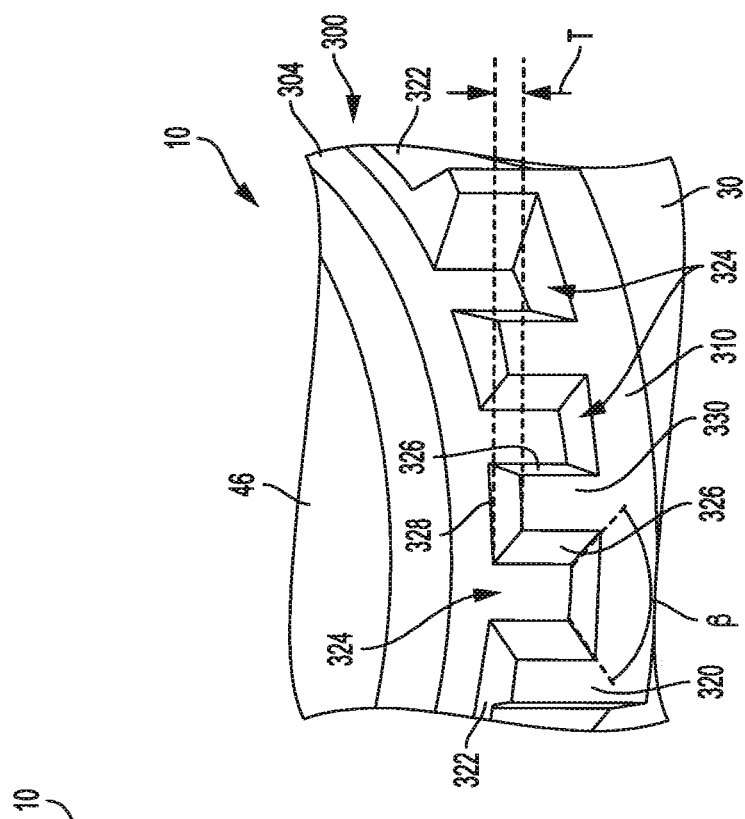
FIG. 6 is an enlarged view of the plurality of flow deflectors shown in FIG. 5.
Figure 5:
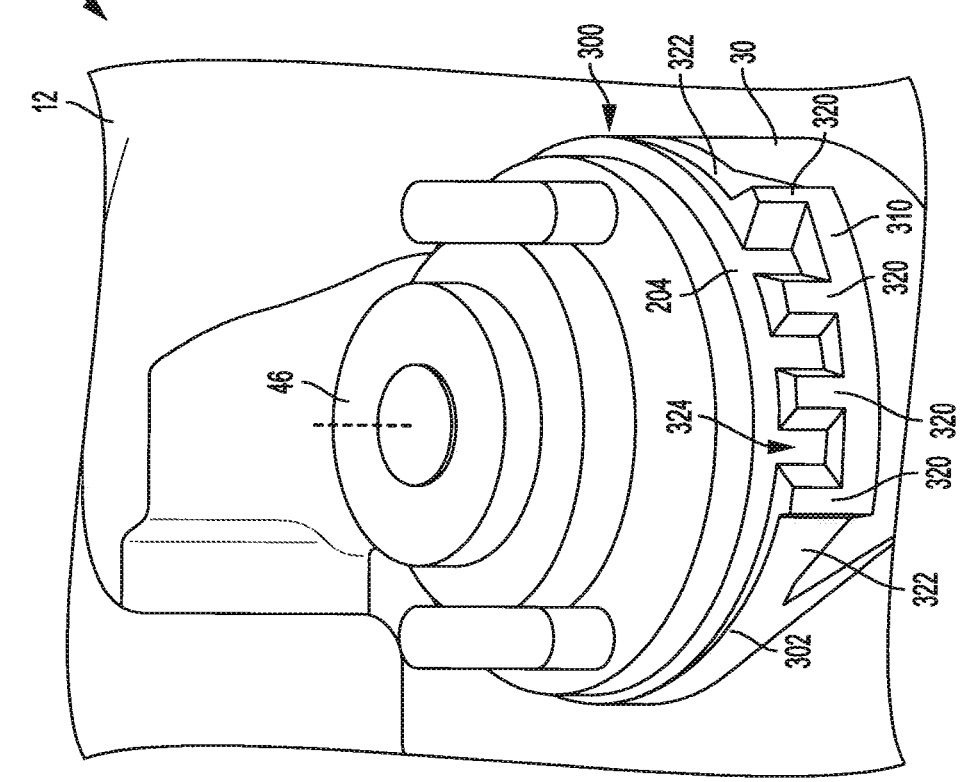
FIG. 5 is a perspective view of an example wastegate outer housing having a plurality of flow deflectors, in accordance with the principles of the present application.

FIGS. 5-7 illustrate another example wastegate outer housing 300 coupled to the bypass channel 30. The wastegate outer housing 300 includes a sidewall 302, an outer valve seating surface 304, and an aperture 306. The outer valve seating surface 304 is configured to provide a seating surface for wastegate valve 46, and aperture 306 is configured to fluidly couple to the bypass channel 30.

In the example embodiment, wastegate outer housing 300 includes a plurality of flow deflectors 320 configured to direct and/or uniformly spread wastegate bypass flow towards and across catalyst 110. As illustrated, flow deflectors 320 extend upwardly (as shown in FIG. 5) from the outer valve seating surface 304. The flow deflectors 320 are spaced apart from each other along a perimeter ledge 310 of the outer valve seating surface 304. The outermost flow deflectors 320 are each coupled to walls 322 extending upwardly (as shown in FIG. 5) from the outer valve seating surface 304 along perimeter ledge 310. The walls 322 are curved as they extend along perimeter ledge 310 and are configured to direct the exhaust flow from bypass channel 30 toward the flow deflectors 320. Flow channels 324 are defined between adjacent flow deflectors 320 to direct the bypass flow received from the bypass channel 30 and/or walls 322.

In the illustrated example, the flow deflectors 320 have a trapezoidal cross-section defining angled side walls 326 extending between a radially inner wall 328 and a radially outer wall 330. The flow deflectors 320 are arranged such that angled side walls 326 converge as they extend from the radially inner wall 328 to the radially outer wall 330. Accordingly, as shown in FIG. 6, the flow deflectors 320 have a deflector thickness 'T', a deflector height (e.g., two times height 'h'), and the angled side walls 326 of adjacent flow deflectors 320 define a deflector angle 'β' therebetween. The deflector angle 'β' is configured to spread and direct the bypass flow passing through the flow channels 324 in a desired pattern and/or direction.

In one example, angle 'β' is between approximately 30° and approximately 45° or between 30° and 45°. However, it will be appreciated that flow deflectors 320 may have various deflector thicknesses 'T', deflector heights 'H', and deflector angles 'β'. Moreover, the deflector angles 'β' between adjacent flow deflectors 320 may be uniform throughout all flow deflectors 320, or may vary between adjacent flow deflectors 320. For example, as flow deflectors 320 extend along perimeter ledge 310, the deflector angle 'β' may alternate between a deflector angle 'β' of 30° and a deflector angle 'β' of 45°.

Figure 8:
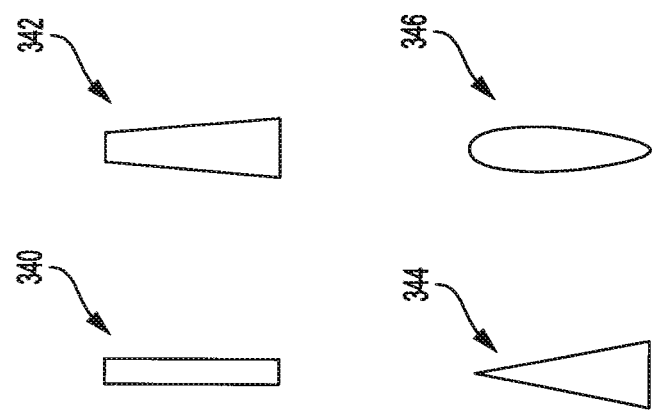
FIG. 8 illustrates various cross-sectional shapes of flow deflectors, in accordance with the principles of the present application.

Additionally, it will be appreciated that flow deflectors 320 are not limited to a trapezoidal cross-section and can have any suitable cross-sectional shape that enables flow deflectors 320 to function as described herein. For example, as shown in FIG. 8, flow deflectors may have a rectangular cross-section 340, a trapezoidal cross-section 342, a triangular cross-section 344, or an airfoil shaped cross-section 346. Moreover, the cross-sectional shape of flow deflectors 320 may vary as the flow deflectors 320 extend along outer valve seating surface 304. For example, one or more cross-sectional shapes 340, 342, 344, 346 may be utilized on the same outer valve seating surface 304 to provide a unique and desired flow pattern/uniformity. Additionally, in other embodiments, flow deflectors 320 may also be utilized in conjunction with shroud 208 to provide a desired wastegate bypass flow to the catalyst 110.

Described herein are systems and methods for controlling wastegate bypass flow in a turbocharger. The systems include a shroud on the wastegate housing and/or flow deflectors to direct wastegate bypass flow toward and uniformly across the face of a catalyst, rather than focused areas of the catalyst or the turbocharger walls. Such flow uniformity is achieved, at least in part, by directing the bypass exhaust flow towards low velocity areas. This prevents a non-uniform bypass flow across the catalyst, which can cause damage thereto, for example, during peak power conditions. Additionally, the need to alter the wastegate blade shape and size is obviated.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A turbocharger for a vehicle, comprising:
a housing;
a turbine wheel;
a bypass channel formed in the housing;
a wastegate assembly having a valve and configured to selectively allow a flow of exhaust gas to bypass the turbine wheel via the bypass channel;
a wastegate outer housing having an aperture fluidly coupled to the bypass channel, and an outer valve seating surface, the valve configured to selectively seat against the outer valve seating surface over the aperture; and
a shroud extending outwardly from the wastegate outer housing, the shroud configured to direct the bypass exhaust gas flow toward a catalytic converter such that the bypass exhaust gas flow is uniformly spread across a catalyst of the catalytic converter,
wherein the shroud includes a ramped surface disposed at an angle 'α' relative to a longitudinal axis of the bypass channel, and
wherein the angle 'α' is between approximately 30° and approximately 60°.

2. The turbocharger of claim 1, wherein the shroud is angled relative to the outer valve seating surface.

3. The turbocharger of claim 1, wherein the shroud extends from and along a perimeter of the outer valve seating surface.

4. The turbocharger of claim 1, further comprising a plurality of flow deflectors extend outwardly from the wastegate outer housing, the plurality of flow deflectors configured to direct the bypass exhaust gas flow toward the catalytic converter such that the bypass exhaust gas flow is uniformly spread across the catalyst.

5. A turbocharger for a vehicle, comprising:
a housing;
a turbine wheel;
a bypass channel formed in the housing;
a wastegate assembly having a valve and configured to selectively allow a flow of exhaust gas to bypass the turbine wheel via the bypass channel;
a wastegate outer housing having an aperture fluidly coupled to the bypass channel, and an outer valve seating surface, the valve configured to selectively seat against the outer valve seating surface over the aperture; and
a plurality of flow deflectors extend outwardly from the wastegate outer housing, the plurality of flow deflectors configured to direct the bypass exhaust gas flow toward a catalytic converter such that the bypass exhaust gas flow is uniformly spread across a catalyst of the catalytic converter.

6. The turbocharger of claim 5, wherein the shroud includes a ramped surface disposed at an angle 'α' relative to a longitudinal axis of the bypass channel, wherein the angle 'α' is determined by the equation $$\tan^{-1}\left[\frac{t}{2h}\right],$$

where 't' is a deflector thickness and 'h' is a wastegate opening height at peak power.

7. The turbocharger of claim 5, wherein flow channels are defined between adjacent flow deflectors and configured to receive at least a portion of the bypass exhaust gas flow from the bypass channel.

8. The turbocharger of claim 5, wherein the flow deflectors extend from a perimeter ledge of the wastegate outer housing.

9. The turbocharger of claim 5, wherein the flow deflectors of at least a portion of the plurality of flow deflectors have a trapezoidal cross-section.

10. The turbocharger of claim 9, wherein an angle 'β' is defined between sidewalls of adjacent flow deflectors of trapezoidal cross-section.

11. The turbocharger of claim 10, wherein the angle 'β' is between approximately 30° and approximately 45°.

12. The turbocharger of claim 5, wherein the flow deflectors of at least a portion of the plurality of flow deflectors have a rectangular cross-section.

13. The turbocharger of claim 5, wherein the flow deflectors of at least a portion of the plurality of flow deflectors have an airfoil shaped cross-section.

14. The turbocharger of claim 5, wherein the flow deflectors of at least a portion of the plurality of flow deflectors have a triangular cross-section.

15. The turbocharger of claim 5, further comprising a shroud extending outwardly from the wastegate outer housing, the shroud configured to direct the bypass exhaust gas flow toward the catalytic converter such that the bypass exhaust gas flow is uniformly spread across the catalyst.

16. A turbocharger system for a vehicle, comprising:
an exhaust system having a catalytic converter, which includes a catalyst; and
a turbocharger including:
a housing;
a turbine wheel;
a bypass channel formed in the housing;
a wastegate assembly having a valve and configured to selectively allow a flow of exhaust gas to bypass the turbine wheel via the bypass channel; and
a wastegate outer housing having an aperture fluidly coupled to the bypass channel, and an outer valve seating surface, the valve configured to selectively seat against the outer valve seating surface over the aperture;
a shroud extending outwardly from the wastegate outer housing; and
a plurality of flow deflectors extending outwardly from the wastegate outer housing;
wherein the shroud and the plurality of flow deflectors are each configured to direct the bypass exhaust gas flow toward the catalytic converter such that the bypass exhaust gas flow is uniformly spread across the catalyst of the catalytic converter.

\* \* \* \* \*